June 16, 1959 H. R. KEEPERS 2,890,592
VARIABLE PITCH SHEAVE

Filed Jan. 8, 1957 2 Sheets-Sheet 1

INVENTOR.
HARRY R. KEEPERS,
BY
ATTORNEYS.

June 16, 1959  H. R. KEEPERS  2,890,592
VARIABLE PITCH SHEAVE

Filed Jan. 8, 1957  2 Sheets-Sheet 2

INVENTOR.
HARRY R. KEEPERS,
BY Allen & Allen
ATTORNEYS.

United States Patent Office 2,890,592
Patented June 16, 1959

2,890,592

VARIABLE PITCH SHEAVE

Harry R. Keepers, Maysville, Ky., assignor to Browning Manufacturing Company, Maysville, Ky., a corporation of Kentucky Application January 8, 1957, Serial No. 633,136

4 Claims. (Cl. 74—230.17)

Variable pitch sheaves generally comprise a hub upon which a pair of flanges are mounted, the two flanges having complementary faces forming V-grooves for use with V-belts. Means are usually provided whereby the distance between the two flanges may be varied so that the V-belt may ride on a smaller or larger diameter so that the speed of transmission may be varied. Various pulley constructions permitting of such adjustment have been provided in the past and they have been provided with various locking means all of which have been subject to one or another disadvantage.

It is therefore an object of the present invention to provide a variable pitch sheave which can be adjusted in small increments and which can be set or locked in adjusted positions in a manner which is free from the various objections encountered in the past and which provides for high torque transmission. It is another object of the invention to provide a double adjustable sheave having the same advantages as the single adjustable sheave and in this connection it is still another object of the invention to provide a method to produce an end to end keyway in a hub having an intermediate radially extending flange.

These and other objects of the invention which will be pointed out in more detail hereinafter or which will be apparent to one skilled in the art upon reading these specifications are accomplished by that certain construction and arrangement of parts and by that method of which I shall now disclose exemplary embodiments.

Reference is made to the drawings forming a part hereof and in which.

Figure 2:
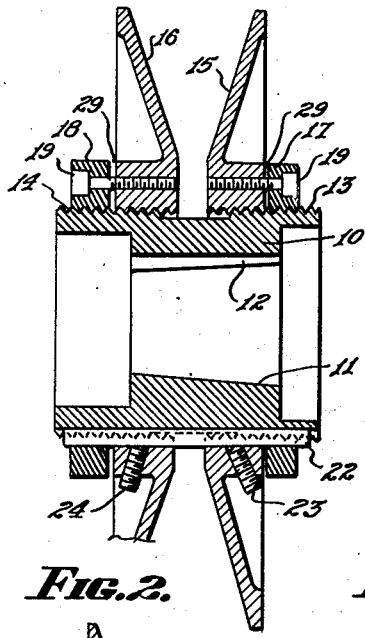
Figure 2 is a fragmentary cross-sectional view thereof taken on the line 2—2 of Figure 1.

Briefly, in the practice of my invention I provide a hub having external threads over substantially one-half of its length at each end. Threaded onto the hub on each side thereof are complementary flanges which together form a V-groove and locking rings by means of which the flanges may be clamped to the threads of the hub. The hub is provided with preferably four keyways spaced 90° apart around the hub and the flanges are provided with two keyways spaced 90° apart.

Referring more specifically to the drawings, a hub is indicated at 10. The hub may be provided with a suitable taper 11 for engagement upon a drive shaft and may be provided with the usual keyway 12. On its exterior it is provided with the threaded portions 13 and 14. A pair of complementary flanges having internal threads is provided at 15 and 16, so that the flanges 15 and 16 may be rotated relative to the hub 10 or the hub 10 may be rotated with respect to the flanges, to adjust the position of the flanges 15 and 16 with respect to the hub and with respect to each other.

Associated with each of the flanges is a locking ring 17 and 18. The locking rings 17 and 18 have internal threads of the same dimensions as the flanges 15 and 16. The rings 17 and 18 are preferably drilled and counterbored to accept the screws 19 which are threaded into the respective flanges 15 and 16. The flanges 15 and 16 and the locking rings 17 and 18 are provided with two keysways 20 and 21 which are 90° apart and which are arranged to accept a key 22. Each of the flanges 15 and 16 is provided with a set screw 23, 24 communicating with the keyways 20 and 21 so that the key 22 may be secured in position.

The hub 10 is provided with four end to end keyways 25, 26, 27, 28.

Figure 3:
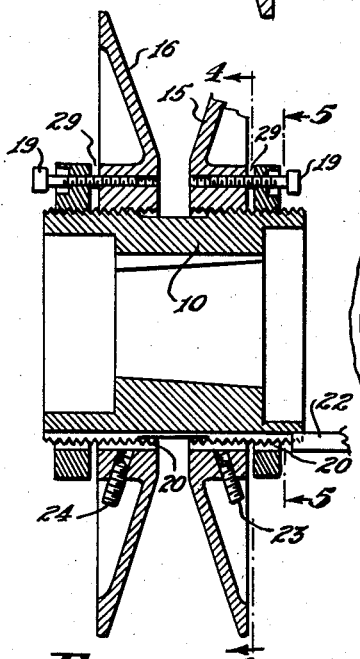
Figure 3 is a view similar to Figure 2 showing how the sheave is adjusted.
Figure 4:
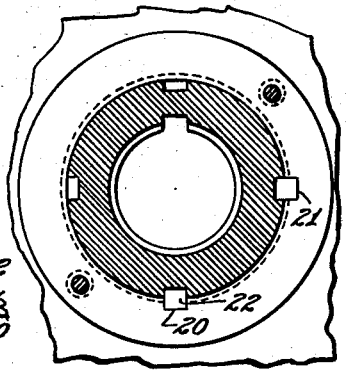
Figure 4 is a fragmentary cross-sectional view taken on the line 4—4 of Figure 3.
Figure 5:
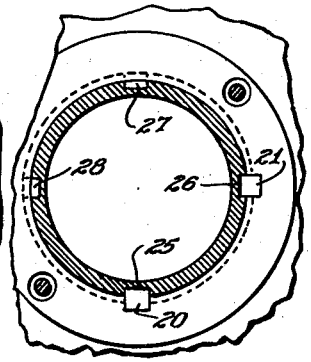
Figure 5 is a fragmentary cross-sectional view taken on the line 5—5 of Figure 3.
Figure 8:
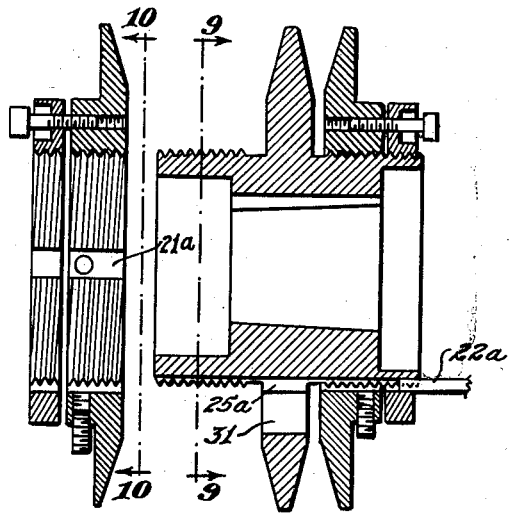
Figure 8 is an exploded view similar to Figure 7.
Figure 7:
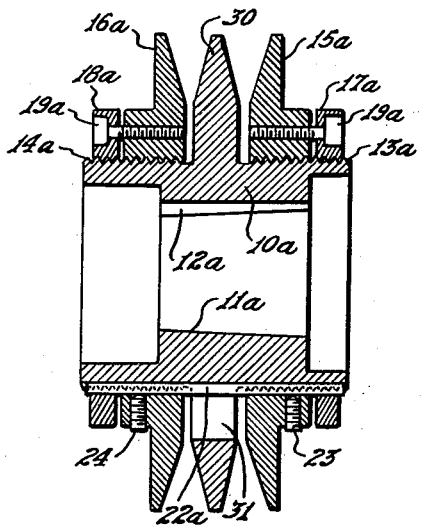
Figure 7 is a cross-sectional view thereof taken on the line 7—7 of Figure 6.
Figure 6:
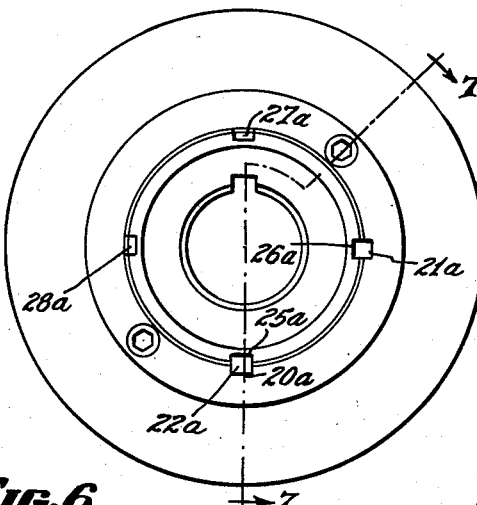
Figure 6 is a view similar to Figure 1 of a double variable pitch sheave.
Figure 10:
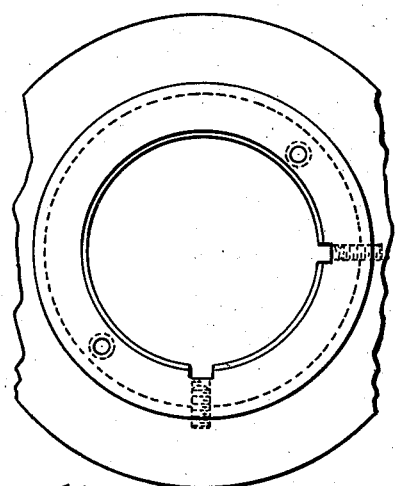
Figure 10 is a fragmentary cross-sectional view taken on the line 10—10 of Figure 8.
Figure 9:
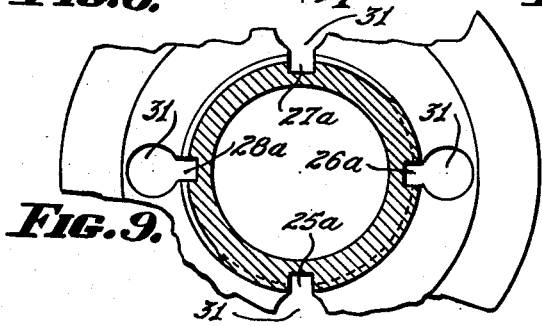
Figure 9 is a fragmentary cross-sectional view taken on the line 9—9 of Figure 8.

Initially the locking ring 17 is assembled to its flange 15 and the locking ring 18 to its flange 16 by means of the screws 19 and as will be clear from Figures 2 and 3, a small space 29 will be left between the respective flanges and locking rings. The keyways 20 and 21 through the flanges and locking rings are of course aligned when the flanges and locking rings are assembled by means of the screws 19. In this condition, the assembly of the flange 15 and the locking ring 17 is screwed on one end of the hub 10 and the assembly of the flange 16 and locking ring 18 is screwed on the other end of the hub. When the two flanges are suitably centered and are at the correct spacing, one of the keyways 25, 26, 27, 28 in the hub must be aligned with one of the two keyways 20, 21 in the two flanges and locking rings. When they are suitably aligned, the key 22 is slipped into place, the set screws 23 and 24 are tightened, thus holding the key in place and the screws 19 are tightened, thus tending to draw the locking ring 17 and flange 15 together and the flange 16 and locking ring 18 together to lock the two assemblies on the threads 13 and 14 respectively. In this condition, as shown in Figure 2, the pulley is ready for use. The basic function of the locking ring is to eliminate axial vibration and subsequent wear of the threaded portions. Such vibration is caused by belt side pressure being unequally applied to the flanges around the periphery of their path due to the rotation of the assembly in operation.

If it is now desired to change the pitch by changing the spacing between the flanges 15 and 16, the set screws 23 and 24 are loosened as seen in Figure 3 and the screws 19 are loosened as also seen in Figure 3. The key 22 is then withdrawn (Figure 3) and the flange assemblies may then be turned in quarter turn increments to bring the flanges 15 and 16 toward each other or to separate them. Thus, if the threads 13 and 14 are sixteen to the inch, one full turn of each flange with respect to the hub would change the spacing between the flanges 15 and 16 by one-eighth inch and therefore each quarter turn of each flange would change the spacing by one thirty-second inch.

Although it is recommended that any adjustment of flanges be made with each flange turned an equal number of turns and/or part turns, it is possible to make $\frac{1}{64}$" adjustment, if it is necessary, by turning one of the flanges a quarter turn in respect to the other flange and hub. This is made possible by the fact that the flanges have two keyways.

Figure 1:
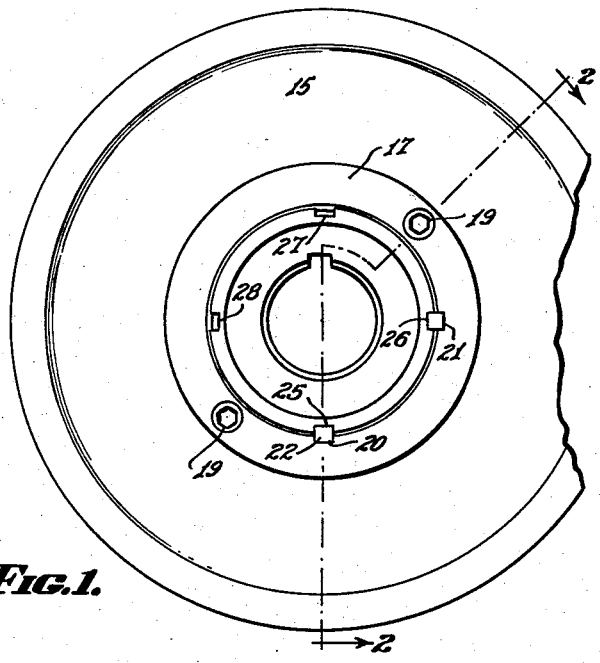
Figure 1 is a fragmentary elevational view of a single variable pitch sheave according to the invention.

Referring to Figure 1, for example, if it is desired to rotate the flange 15 a quarter turn without rotating the flange 16 and if the rotation of the flange 15 is to be clockwise as seen in Figure 1, it will be clear that the key 22 will pass through the keyway 21 of the flange 15 while it still passes through the keyway 20 of the flange 16. If the adjustment is to be in a counterclockwise direction, the keyway 20 will move to the position of 21 and the key 22 will then have to be removed and put in through the keyway 20 which will now be opposite the keyway 26.

A sheave according to this invention is therefore very flexible in that with threads of the pitch given in the example adjustments in increments of one thirty-second inch may be made by rotating each flange in quarter turn increments with respect to the hub, and an additional sixty-fourth inch change can then be achieved by rotating either flange with respect to the hub and the other flange. In any position of adjustment, the two flanges, the two locking rings and the hub are keyed together by an end to end key, the key is secured in position by set screws and further the flanges are clamped by the locking rings 17 and 18.

In Figures 6 to 10 inclusive, I have shown the same construction and principle applied to a double variable pitch sheave. In these figures, insofar as possible I have used the same reference numerals to indicate the same parts. The sheave of Figures 6 to 10 inclusive comprises a hub 10a, as before having the taper 11a and keyway 12a and the threads 13a and 14a. The hub differs from that of Figures 1 to 5 inclusive in that it has a central radial flange 30 which is integral with the hub and provides opposed conical faces complementary to the two complementary flanges 15a and 16a. Again I provide the locking rings 17a and 18a and the screws 19a. Again the complementary flanges have the keyways 20a and 21a and a key 22a is provided. As before, I provide set screws 23 and 24 communicating with the keyways 20a and 21a to secure the key 22a in place. The hub again is provided with the four keyways 25a, 26a, 27a and 28a. These keyways 25a to 28a are again end to end keyways and in this connection there arises the problem of how to provide these keyways in view of the central flange 30 which is integral with the hub 10a.

I overcome this problem by drilling or otherwise suitably forming holes 31 in the flange 30 at 90° intervals around the flange and substantially tangent to the hub so that I may pass a broaching tool through the holes 31 and broach the keyways 25a to 28a. The holes 31 make it possible to provide end to end keyways for the hub 10a and they do not substantially weaken the central flange 30 nor do they interfere with the functioning of the device in any manner whatsoever.

The assembly of the double sheave is the same as the single sheave and the manner of adjusting it is the same as has been described above in connection with the single sheave, except that both flanges must be adjusted an equal number of turns and/or part turns.

It will be clear that various modifications may be made without departing from the spirit of the invention and I, therefore, do not intend to limit myself except as set forth in the claims which follow.

Having now fully described my invention, what I claim as new and desire to secure by Letters Patent is:

1. A variable pitch sheave comprising a hub having external threads over substantially one-half of its length at each end, a pair of complementary flanges having internal threads cooperating with said external threads, said flanges being threaded onto the respective threads on said hub a pair of locking rings having internal threads of the same dimension as said flanges, said rings being threaded onto the respective threads on said hub to the outside of said flanges and in spaced relation to said flanges, screws passing through each of said rings and threaded into the respective flanges, at least one aligned keyway through said flanges and rings, a plurality of keyways on said hub extending from end to end thereof, and a key in said aligned keyways, whereby each flange may be adjusted with respect to the hub by removing said key, aligning the flange and ring keyway with one of the hub keyways, inserting said key into said aligned keyways and tightening the screws passing through the ring to cause said ring and flange to clamp the hub threads between them.

2. A variable pitch sheave according to claim 1, wherein each flange has two keyways 90° apart and said hub has four end to end keyways 90° apart, whereby both said flanges may be adjusted on said hub in quarter turn increments, and each flange may be adjusted one quarter turn with respect to the other.

3. A variable pitch sheave according to claim 1, wherein said hub has a central integral flange having opposed faces cooperating with said complementary flanges, said central flanges having holes therethrough adjacent the hub, said end to end keyways communicating with said holes.

4. A variable pitch sheave according to claim 3, wherein each complementary flange has two keyways 90° apart, and said hub has four end to end keyways 90° apart communicating with four holes in said central flange, whereby both said flanges may be adjusted on said hub in quarter turn increments.

References Cited in the file of this patent

UNITED STATES PATENTS

| | | |
|---|---|---|
| 171,898 | Wiles | Jan. 4, 1876 |
| 1,609,380 | Murray | Dec. 7, 1926 |
| 1,840,941 | Eksergian | Jan. 12, 1932 |
| 2,555,189 | Fuschlocher | May 29, 1951 |
| 2,633,031 | Browning | Mar. 31, 1953 |
| 2,662,416 | Simonsen | Dec. 15, 1953 |

FOREIGN PATENTS

| | | |
|---|---|---|
| 109,367 | Sweden | Dec. 21, 1943 |